United States Patent
Fukunaga et al.

(10) Patent No.: US 11,094,462 B2
(45) Date of Patent: Aug. 17, 2021

(54) MULTILAYER CERAMIC ELECTRONIC COMPONENT

(71) Applicant: Murata Manufacturing Co., Ltd., Nagaokakyo (JP)

(72) Inventors: Daiki Fukunaga, Nagaokakyo (JP); Hideaki Tanaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 34 days.

(21) Appl. No.: 16/656,703

(22) Filed: Oct. 18, 2019

(65) Prior Publication Data

US 2020/0126721 A1 Apr. 23, 2020

(30) Foreign Application Priority Data

Oct. 22, 2018 (JP) .............................. JP2018-198419
Oct. 22, 2018 (JP) .............................. JP2018-198421
Aug. 28, 2019 (JP) .............................. JP2019-155765

(51) Int. Cl.
  *H01G 4/30* (2006.01)
  *H01G 4/12* (2006.01)
  *H01G 4/232* (2006.01)

(52) U.S. Cl.
  CPC ........... *H01G 4/1209* (2013.01); *H01G 4/232* (2013.01); *H01G 4/30* (2013.01); *H01G 4/1227* (2013.01); *H01G 4/1236* (2013.01)

(58) Field of Classification Search
  None
  See application file for complete search history.

(56) References Cited

U.S. PATENT DOCUMENTS

| | | | | |
|---|---|---|---|---|
| 8,804,305 | B2* | 8/2014 | Kim | H01G 4/2325 361/321.2 |
| 10,020,117 | B2* | 7/2018 | Mizuno | H01G 4/1227 |
| 10,141,114 | B2* | 11/2018 | Ono | H01G 4/12 |
| 2012/0236460 | A1* | 9/2012 | Kim | H01G 4/12 361/301.4 |

(Continued)

FOREIGN PATENT DOCUMENTS

| | | |
|---|---|---|
| JP | 2017-147429 A | 8/2017 |
| KR | 10-1240804 B1 | 3/2013 |
| KR | 10-2018-0067482 A | 6/2018 |

OTHER PUBLICATIONS

Official Communication issued in corresponding Korean Patent Application No. 10-2019-0125919, dated Dec. 24, 2020.

*Primary Examiner* — Dion Ferguson
(74) *Attorney, Agent, or Firm* — Keating & Bennett, LLP

(57) ABSTRACT

A multilayer ceramic electronic component includes a laminate, a first external electrode on a first end surface of the laminate, and a second external electrode on a second end surface of the laminate. The laminate includes a central layer portion in which each first internal electrode layer and each second internal electrode layer oppose each other with a dielectric ceramic layer therebetween, peripheral layer portions sandwiching the central layer portion in a lamination direction, and side margins sandwiching the central layer portion and the peripheral layer portions in a width direction. The side margins each include multiple ceramic layers laminated in the width direction, and the ceramic layers include an inner layer disposed closest to the laminate and an outer layer disposed farthest from the laminate.

16 Claims, 7 Drawing Sheets

(56) References Cited

U.S. PATENT DOCUMENTS

| | | | |
|---|---|---|---|
| 2013/0009515 A1* | 1/2013 | Kim | H01G 4/30 |
| | | | 310/311 |
| 2015/0340155 A1* | 11/2015 | Fukunaga | H01G 4/012 |
| | | | 361/301.4 |
| 2017/0018363 A1* | 1/2017 | Tanaka | H01G 4/30 |
| 2017/0169952 A1* | 6/2017 | Kato | H01G 4/005 |
| 2017/0243697 A1* | 8/2017 | Mizuno | H01G 4/232 |
| 2020/0066446 A1* | 2/2020 | Fukunaga | H01G 4/2325 |
| 2020/0203074 A1* | 6/2020 | Ono | H01G 4/012 |

* cited by examiner

MULTILAYER CERAMIC ELECTRONIC COMPONENT

CROSS REFERENCE TO RELATED APPLICATIONS

This application claims the benefit of priority to Japanese Patent Application No. 2018-198419 filed on Oct. 22, 2018, Japanese Patent Application No. 2018-198421 filed on Oct. 22, 2018, and Japanese Patent Application No. 2019-155765 filed on Aug. 28, 2019. The entire contents of these applications are hereby incorporated herein by reference.

BACKGROUND OF THE INVENTION

1. Field of the Invention

The present invention relates to a multilayer ceramic electronic component.

2. Description of the Related Art

Examples of multilayer ceramic electronic components include a multilayer ceramic capacitor. The multilayer ceramic capacitor includes, for example, a laminate in which dielectric ceramic layers and internal electrode layers are alternately laminated and dielectric ceramic layers are further laminated on the top and bottom surfaces thereof, and an external electrode formed on both end surfaces of the laminate. Some of such multilayer ceramic capacitors include a ceramic layer called a "side margin" on each lateral surface in order to prevent connection between the internal electrode layer and the external electrode at the lateral surface of the laminate.

For example, JP 2017-147429 A discloses a multilayer ceramic capacitor including a laminate portion, a side margin, and a joint portion. The laminate portion includes multiple ceramic layers that are made of a first ceramic having a first average crystal grain size and that are laminated in a first direction, and internal electrodes each disposed between the ceramic layers. The side margin is made of a second ceramic having a second average crystal grain size, and covers the laminate portion in a second direction perpendicular or substantially perpendicular to the first direction. The joint portion is made of a third ceramic having a third average crystal grain size larger than the first and second average crystal grain sizes, and is disposed between the laminate portion and each side margin.

In the multilayer ceramic capacitor disclosed in JP 2017-147429 A, the body includes the laminate portion, the joint portions, and the side margins. A first external electrode and a second external electrode are formed such that they cover the end surfaces of the body. These external electrodes are usually formed by firing conductive paste applied to the body to form a base film and plating the base film.

In the multilayer ceramic capacitor disclosed in JP 2017-147429 A, each joint portion made of a ceramic having an average crystal grain size larger than that of ceramic defining the ceramic layers of the laminate portion and the side margin is disposed between the laminate portion and the side margin. Thus, the number of crystal grains in contact with the laminate portion and the side margin decreases on both interfaces of the joint portion. In other words, on both interfaces of the joint portion, there are less grain boundaries that tend to be sites of the onset of cracking and separation of laminate portion and the side margins, so that the laminate portion and the side margins are considered to maintain a good joined state via the joint portion.

Yet, JP 2017-147429 A is silent about the mechanical strength, particularly the hardness, of the side margin. Thus, there is room for improvement in making the multilayer ceramic capacitor less prone to cracking and chipping.

JP 2017-147429 A is also silent about cracking and chipping of the side margin, and particularly, there is room for improvement in making edges of the body (hereinafter also referred to as a "laminate") less prone to cracking and chipping.

JP 2017-147429 A is also silent about wettability of the external electrode to the laminate, and particularly, there is room for improvement in favorably forming the external electrode at the edges of the laminate.

These problems are not limited to multilayer ceramic capacitors but are common to multilayer ceramic electronic components other than the multilayer ceramic capacitors.

SUMMARY OF THE INVENTION

Preferred embodiments of the present invention provide multilayer ceramic electronic components each having a high mechanical strength. Preferred embodiments of the present invention also provide multilayer ceramic electronic components in each of which edges of a laminate are less prone to cracking and chipping and which allows an external electrode to be easily formed.

A multilayer ceramic electronic component according to a preferred embodiment of the present invention includes a laminate including multiple dielectric ceramic layers and multiple pairs of a first internal electrode layer and a second internal electrode layer laminated in a lamination direction. The laminate includes a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a longitudinal direction perpendicular or substantially perpendicular to the lamination direction and the width direction. The multilayer ceramic electronic component further includes a first external electrode on the first end surface of the laminate and connected to the first internal electrode layer on the first end surface, and a second external electrode on the second end surface of the laminate and connected to the second internal electrode layer on the second end surface. The laminate includes a central layer portion in which each first internal electrode layer and each second internal electrode layer oppose each other with the dielectric ceramic layer therebetween, peripheral layer portions sandwiching the central layer portion in the lamination direction, and side margins sandwiching the central layer portion and the peripheral layer portions in the width direction. The side margins each include multiple ceramic layers laminated in the width direction, and the ceramic layers include an inner layer closest to the laminate and an outer layer disposed farthest from the laminate. A total amount of at least one element selected from a group consisting of Zr, Al, and Si included in the outer layer is larger than a total amount of at least one element selected from the group consisting of Zr, Al, and Si included in the inner layer.

A multilayer ceramic electronic component according to a preferred embodiment of the present invention includes a laminate including multiple dielectric ceramic layers and multiple pairs of a first internal electrode layer and a second internal electrode layer laminated in a lamination direction, and including a first main surface and a second main surface that oppose each other in the lamination direction, a first lateral surface and a second lateral surface that oppose each other in a width direction perpendicular or substantially perpendicular to the lamination direction, and a first end surface and a second end surface that oppose each other in a longitudinal direction perpendicular or substantially perpendicular to the lamination direction and the width direction. The multilayer ceramic electronic component further includes a first external electrode on the first end surface of the laminate and connected to the first internal electrode layer on the first end surface and a second external electrode on the second end surface of the laminate and connected to the second internal electrode layer on the second end surface. The laminate includes a central layer portion in which each first internal electrode layer and each second internal electrode layer oppose each other with the dielectric ceramic layer therebetween, peripheral layer portions sandwiching the central layer portion in the lamination direction, and side margins sandwiching the central layer portion and the peripheral layer portions in the width direction. A stepped portion including two or more steps is provided at an edge between the main surface and the lateral surface of the laminate.

According to preferred embodiments of the present invention, it is possible to provide multilayer ceramic electronic components each having a high mechanical strength, and in which edges of the laminate are less prone to cracking and chipping and which allows an external electrode to be easily formed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of multilayer ceramic electronic components of the present invention are described in detail below with reference to the drawings.

The present invention is not limited to the following preferred embodiments, and may be suitably modified without departing from the gist of the present invention. Combinations of two or more preferred features described in the following preferred embodiments are also within the scope of the present invention.

The following preferred embodiments are examples, and features of different preferred embodiments can be partially exchanged or combined with each other. In the second preferred embodiment and subsequent preferred embodiments, a description of features common to the first preferred embodiment is omitted, and only different points are described. In particular, similar advantageous effects by similar features are not mentioned in each preferred embodiment.

Multilayer ceramic capacitors are described as example preferred embodiments of the multilayer ceramic electronic components of the present invention. The present invention is also applicable to multilayer ceramic electronic components other than the multilayer ceramic capacitors. Examples of such multilayer ceramic electronic components include inductors, piezoelectric elements, and thermistors.

First Preferred Embodiment

Multilayer Ceramic Capacitor

Figure 1:
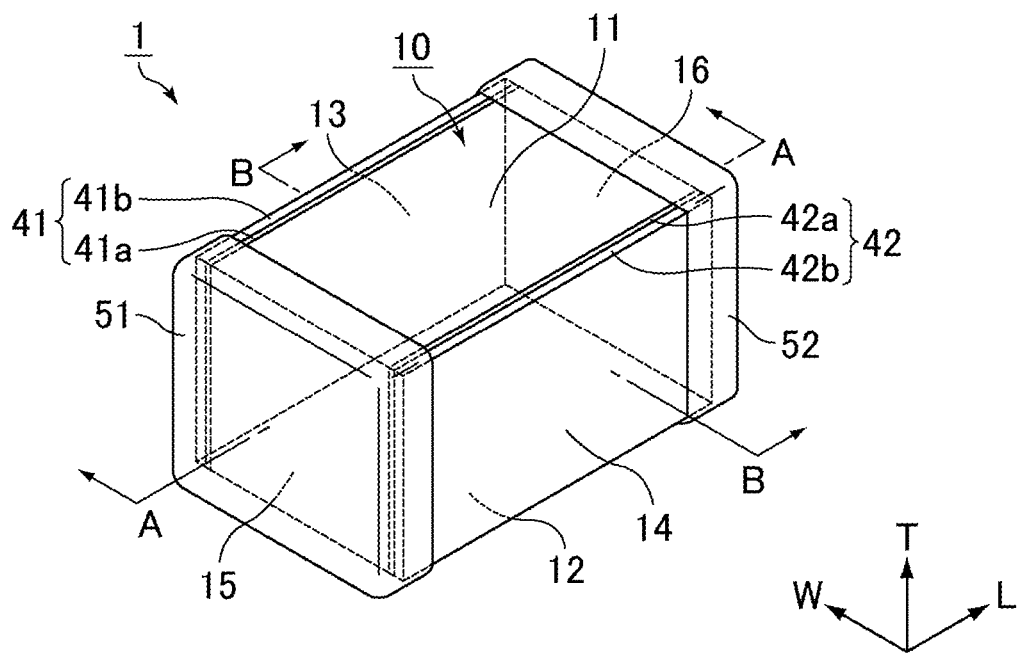
FIG. 1 is a perspective view schematically showing an example multilayer ceramic capacitor according to a first preferred embodiment of the present invention.
Figure 2:
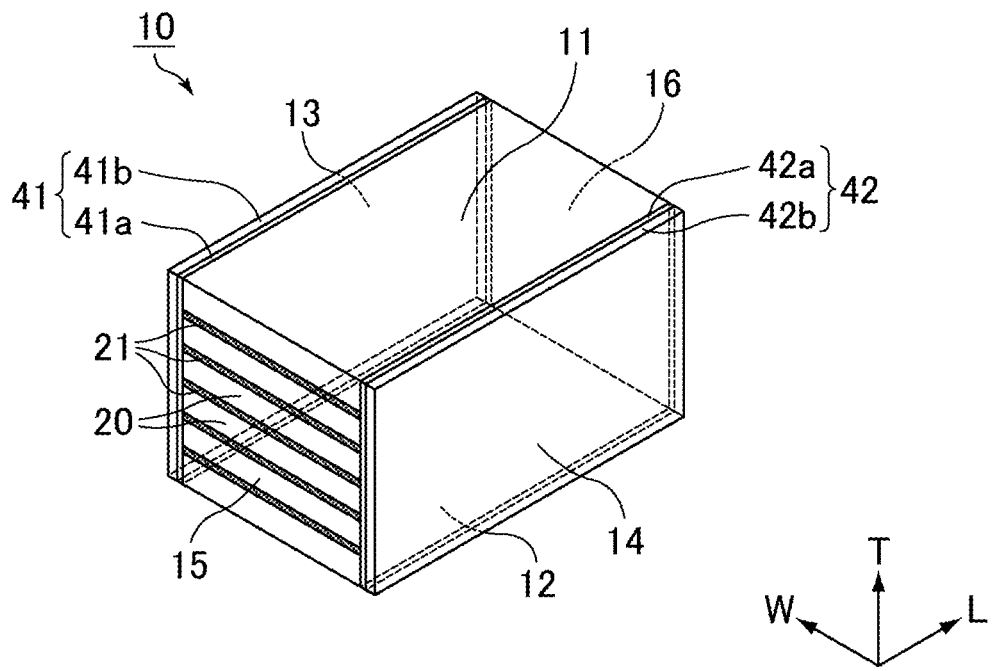
FIG. 2 is a perspective view schematically showing an example laminate defining the multilayer ceramic capacitor shown in FIG. 1.
Figure 4:
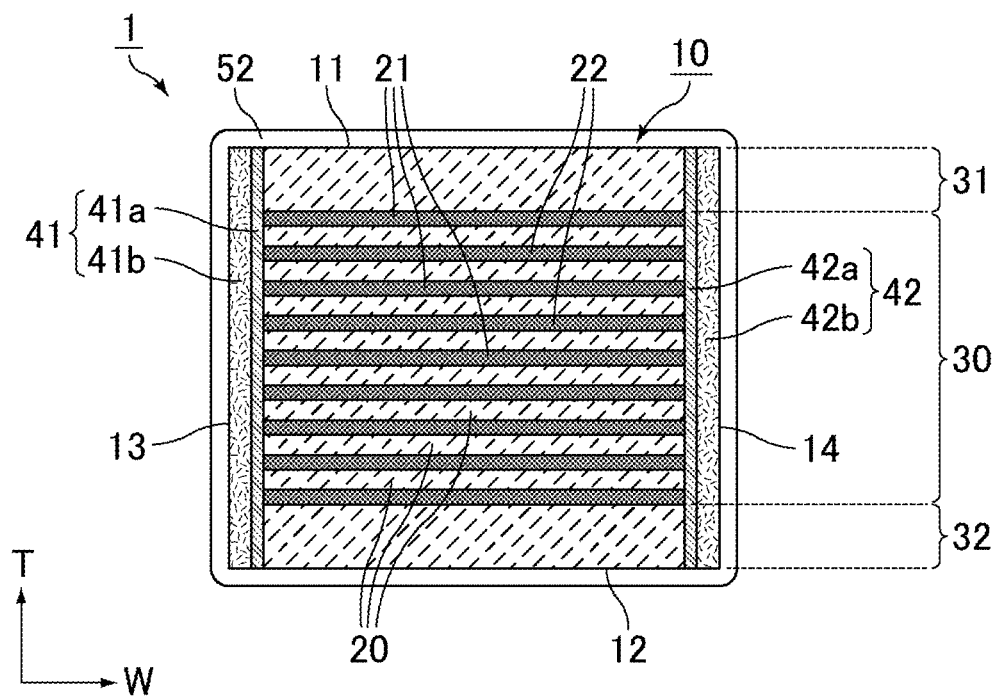
FIG. 4 is a cross-sectional view taken along the line B-B of the multilayer ceramic capacitor shown in FIG. 1.

FIG. 1 is a perspective view schematically showing an example multilayer ceramic capacitor according to the first preferred embodiment of the present invention. FIG. 2 is a perspective view schematically showing an example laminate defining the multilayer ceramic capacitor shown in FIG. 1. FIG. is a cross-sectional view taken along the line A-A of the multilayer ceramic capacitor shown in FIG. 1. FIG. 4 is a cross-sectional view taken along the line B-B of the multilayer ceramic capacitor shown in FIG. 1.

Herein, the lamination direction, width direction, and longitudinal direction of the multilayer ceramic capacitor and the laminate indicate directions specified by arrows T, W, and L, respectively, in a multilayer ceramic capacitor 1 shown in FIG. 1 and a laminate 10 shown in FIG. 2. The lamination (T) direction, the width (W) direction, and the longitudinal (L) direction are perpendicular or substantially perpendicular to each other. The lamination (T) direction is a direction in which multiple dielectric ceramic layers 20 and multiple pairs of a first internal electrode layer 21 and a second internal electrode layer 22 are stacked.

The multilayer ceramic capacitor 1 shown in FIG. 1 includes the laminate 10, a first external electrode 51 on one end surface of the laminate 10, and a second external electrode 52 on the other end surface of the laminate 10.

The size of the multilayer ceramic capacitor 1 represented by dimensions of the longitudinal (L) direction× the width (W) direction× the lamination (T) direction is preferably, for example, 1.6 mm×0.8 mm×0.8 mm, 1.0 mm×0.5 mm×0.5 mm, 0.6 mm×0.3 mm×0.3 mm, 0.4 mm×0.2 mm×0.2 mm, 0.2 mm×0.1 mm×0.1 mm, including approximate dimensions or the like.

As shown in FIG. 2, the laminate 10 is preferably a rectangular cuboid or a substantially rectangular cuboid. The laminate 10 includes a first main surface 11 and a second main surface 12 that oppose each other in the lamination (T) direction, a first lateral surface 13 and a second lateral surface 14 that oppose each other in the width (W) direction perpendicular or substantially perpendicular to the lamination (T) direction, and a first end surface 15 and a second end surface 16 in the longitudinal (L) direction perpendicular or substantially perpendicular to the lamination (T) direction and the width (W) direction.

Herein, a cross section of the multilayer ceramic capacitor 1 or the laminate 10 which is perpendicular or substantially perpendicular to the first end surface 15 and the second end surface 16 and parallel or substantially parallel to the lamination (T) direction is referred to as an LT cross section that is a cross section in the longitudinal (L) direction and the lamination (T) direction. A cross section of the multilayer ceramic capacitor 1 or the laminate 10 which is perpendicular or substantially perpendicular to the first lateral surface 13 and the second lateral surface 14 and parallel or substantially parallel to the lamination (T) direction is referred to as a WT cross section that is a cross section in the width (W) direction and the lamination (T) direction. A cross section of the multilayer ceramic capacitor 1 or the laminate 10 perpendicular or substantially perpendicular to the first lateral surface 13, the second lateral surface 14, the first end surface 15, and the second end surface 16, and perpendicular or substantially perpendicular to the lamination (T) direction is referred to as an LW cross section that is a cross section in the longitudinal (L) direction and the width (W) direction. Thus, FIG. 3 shows the LT cross section of the multilayer ceramic capacitor 1, and FIG. 4 shows the WT cross section of the multilayer ceramic capacitor 1.

In the laminate 10, corners and edges are preferably rounded. The corner is a portion where three surfaces of the laminate meet, and the edge is a portion where two surface of the laminate meet.

Figure 3:
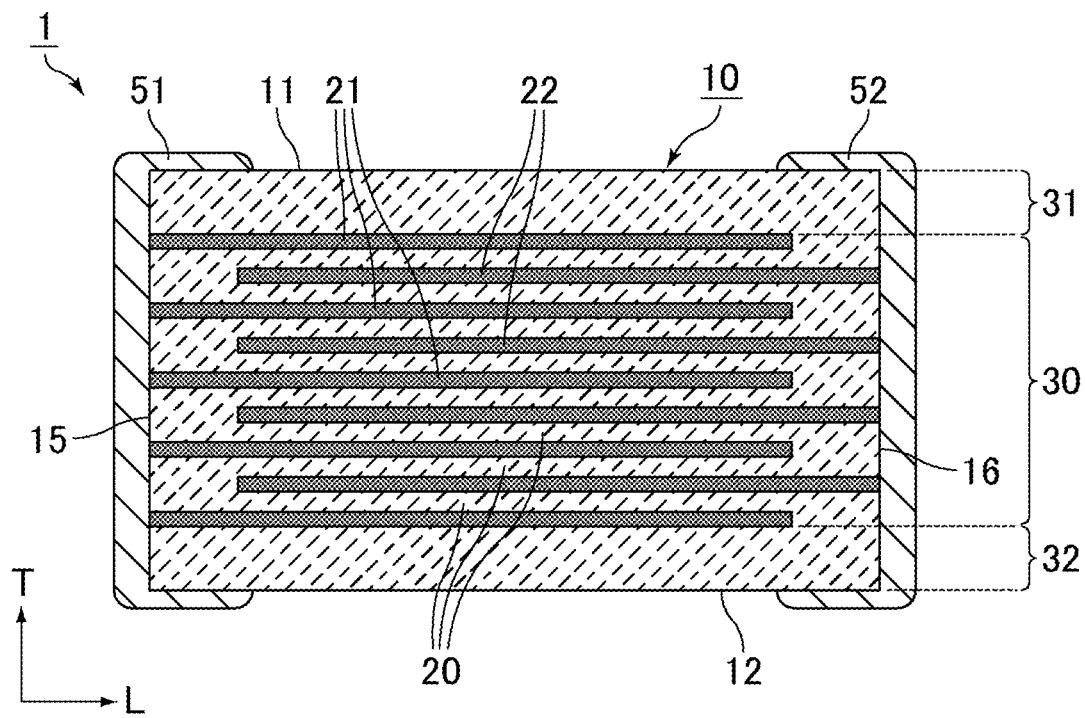
FIG. 3 is a cross-sectional view taken along the line A-A of the multilayer ceramic capacitor shown in FIG. 1.

As shown in FIG. 2, FIG. 3, and FIG. 4, the laminate 10 preferably has a laminated structure including the multiple dielectric ceramic layers 20 stacked in the lamination (T) direction and the first internal electrode layer 21 and the second internal electrode layer 22 alternately provided along the interface between each dielectric ceramic layer 20. The dielectric ceramic layers 20 extend in the width (W) direction and the longitudinal (L) direction, and the first internal electrode layers 21 and the second internal electrode layers 22 each flatly extend along the dielectric ceramic layer 20.

The first internal electrode layers 21 are led out to the first end surface 15 of the laminate 10. The second internal electrode layers 22 are led out to the second end surface 16 of the laminate 10.

Each first internal electrode layer 21 and each second internal electrode layer 22 oppose each other with the dielectric ceramic layer 20 therebetween in the lamination (T) direction. Capacitance is generated from each portion where the first internal electrode layer 21 and the second internal electrode layer 22 oppose each other with the dielectric ceramic layer 20 therebetween.

The first internal electrode layers 21 and the second internal electrode layers 22 each preferably include one or more metals such as Ni, Cu, Ag, Pd, Ag—Pd alloy, and Au, for example. In addition to the one or more metals, the first internal electrode layers 21 and the second internal electrode layers 22 may each include the same dielectric ceramic material as that of the dielectric ceramic layers 20.

The first internal electrode layers 21 and the second internal electrode layers 22 each preferably have a thickness of about 0.3 μm or more and about 2.0 μm or less, for example.

The first external electrode 51 is on the first end surface 15 of the laminate 10. In FIG. 1, the first external electrode 51 includes portions that partially overlap the first main surface 11, the second main surface 12, the first lateral surface 13, and the second lateral surface 14. The first external electrode 51 is connected to the first internal electrode layers 21 on the first end surface 15.

The second external electrode 52 is on the second end surface 16 of the laminate 10. In FIG. 1, the second external electrode 52 includes portions that partially overlap the first main surface 11, the second main surface 12, the first lateral surface 13, and the second lateral surface 14. The second external electrode 52 is connected to the second internal electrode layers 22 on the second end surface 16.

For example, the first external electrode 51 and the second external electrode 52 each may preferably have a three-layered structure including, in the order from one end surface of the laminate 10, a base electrode layer including Cu which is preferably formed by baking, a first plated layer provided on the surface of the base electrode layer, and a second plated layer provided on the surface of the first plated layer.

As shown in FIG. 3 and FIG. 4, the laminate 10 includes a central layer portion 30 in which each first internal electrode layer 21 and each second internal electrode layer 22 oppose each other with the dielectric ceramic layer 20 therebetween, peripheral layer portions 31 and 32 sandwiching the central layer portion 30 in the lamination (T) direction, and side margins 41 and 42 sandwiching the central layer portion 30, the peripheral layer portion 31, and the peripheral layer portion 32 in the width (W) direction. In FIG. 3 and FIG. 4, the central layer portion 30 is a region that is sandwiched by the first internal electrode layer 21 closest to the first main surface 11 and the first internal electrode layer 21 closest to the second main surface 12 in the lamination (T) direction. Although not shown, the peripheral layer portion 31 and the peripheral layer portion 32 are each preferably defined by the multiple dielectric ceramic layers 20 laminated in the lamination (T) direction.

The dielectric ceramic layers 20 defining the central layer portion 30 are preferably made of, for example, a dielectric ceramic material mainly including $BaTiO_3$, $CaTiO_3$, $SrTiO_3$, $CaZrO_3$, or the like. The dielectric ceramic layers 20 defining the central layer portion 30 may further include a sintering aid element described later.

The dielectric ceramic layers 20 defining the central layer portion 30 each preferably have a thickness of about 0.2 μm or more and about 10 μm or less, for example.

The dielectric ceramic layers 20 defining the peripheral layer portion 31 and the peripheral layer portion 32 are preferably made of, for example, a dielectric ceramic material mainly including $BaTiO_3$, $CaTiO_3$, $SrTiO_3$, $CaZrO_3$, or the like. The dielectric ceramic layers 20 defining the peripheral layer portion and the peripheral layer portion 32 may further include a sintering aid element described later.

The dielectric ceramic layers 20 defining the peripheral layer portion 31 and the peripheral layer portion 32 are preferably made of the same dielectric ceramic material as that of the dielectric ceramic layers 20 defining the central layer portion 30, but may be made of a dielectric ceramic material different from that of the dielectric ceramic layers 20 defining the central layer portion 30.

The peripheral layer portions 31 and 32 each preferably have a thickness of about 15 μm or more and about 40 μm or less, for example. The peripheral layer portions 31 and 32 may each have a multilayer structure or a single-layer structure.

The side margin 41 and the side margin 42 each preferably include multiple ceramic layers laminated in the width (W) direction. In FIG. 4, the side margin 41 includes a bilayer structure of the ceramic layers including an inner layer 41a disposed closest to the laminate 10 and an outer layer 41b disposed farthest from the laminate 10. Likewise, the side margin 42 includes a bilayer structure of the ceramic layers including an inner layer 42a disposed closest to the laminate 10 and an outer layer 42b disposed farthest from the laminate 10. The structure of the side margin is not limited to the bilayer structure of the ceramic layers including the inner layer and the outer layer. The side margin may have a three- or more layered structure including another ceramic layer between the inner layer and the outer layer. The number of ceramic layers may be different between the side margin on the first lateral surface side of the laminate and the side margin on the second lateral surface side of the laminate.

When the side margin has a bilayer structure including the inner layer and the outer layer, since the inner layer and the outer layer have different sinterability, observation of these layers using an optical microscope, electronic microscope, or the like can confirm that the structure is indeed a bilayer structure. The same applies when the side margin has a three- or more layered structure.

The inner layer 41a and the inner layer 42a are preferably made of, for example, a dielectric ceramic material mainly including $BaTiO_3$, $CaTiO_3$, $SrTiO_3$, $CaZrO_3$, or the like. The inner layer 41a and the inner layer 42a may further include a sintering aid element described later.

The inner layer 41a and the inner layer 42a are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

The outer layer 41b and the outer layer 42b are preferably made of, for example, a dielectric ceramic material mainly including $BaTiO_3$, $CaTiO_3$, $SrTiO_3$, $CaZrO_3$, or the like. The outer layer 41b and the outer layer 42b further include ZrO, $Al_2O_3$, AlN, SiN, SiC, and the like. Preferably, the outer layer 41b and the outer layer 42b further include a sintering aid element, described later, in addition to these materials.

The outer layer 41b and the outer layer 42b are preferably made of the same dielectric ceramic material as that of the inner layer 41a and the inner layer 42a, but may be made of a dielectric ceramic material different from that of the inner layer 41a and the inner layer 42a. The outer layer 41b and the outer layer 42b are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

Alternatively, the outer layer 41b and the outer layer 42b may be made of, for example, an oxide ceramic material mainly including ZrO, $Al_2O_3$, AlN, SiN, SiC, or the like. In this case, preferably, the outer layer 41b and the outer layer 42b further include a sintering aid element, described later.

In the multilayer ceramic capacitor 1, a total amount of at least one element selected from the group consisting of Zr, Al, and Si included in the outer layer 41b is preferably larger than that in the inner layer 41a. A total amount of at least one element selected from the group consisting of Zr, Al, and Si included in the outer layer 42b is preferably larger than that in the inner layer 42a. The inner layers 41a and 42a do not necessarily include at least one element selected from the group consisting of Zr, Al, and Si.

When the amount of an element such as Zr included in the outer layer is larger than the amount of an element such as Zr included in the inner layer, it can increase the hardness of the side margin, thus increasing the mechanical strength of the multilayer ceramic capacitor. As a result, the multilayer ceramic capacitor is less prone to cracking and chipping.

When the amount of an element such as Zr included in the outer layer is larger than the amount of an element such as Zr included in the inner layer on one lateral surface side, the amount of an element such as Zr included in the outer layer may be equal to or smaller than the amount of an element such as Zr included in the inner layer on the other lateral surface side.

The type of the element such as Zr and its amount included in each ceramic layer can be determined through elemental analysis by wavelength-dispersive X-ray spectroscopy (WDX) of the WT cross section exposed at or substantially at a center in the longitudinal (L) direction of the multilayer ceramic capacitor.

In the multilayer ceramic capacitor 1, the outer layer 41b preferably includes a larger amount of a sintering aid element than the inner layer 41a. The outer layer 42b preferably includes a larger amount of the sintering aid element than the inner layer 42a.

In this case, the outer layer can have a higher sinterability than the inner layer. In addition, the outer layer can have a higher hardness than the inner layer. As a result, the outer layer can be made dense.

Examples of the sintering aid element include Si, B, Li, K, Na, Mn, Mg, Ho, Ca, and V. Only one of these sintering aid elements may be used, or two or more of them may be used. When two or more sintering aid elements are used, preferably, the outer layer includes at least one of these elements in an amount larger than that in the inner layer.

When the amount of the sintering aid element in the outer layer is larger than the amount of the sintering aid element in the inner layer on one lateral surface side, the amount of the sintering aid element in the outer layer may be equal to or smaller than the amount of the sintering aid element in the inner layer on the other lateral surface side.

The type of the sintering aid element and its amount in each ceramic layer can be determined through elemental analysis by wavelength-dispersive X-ray spectroscopy (WDX) of the WT cross section exposed at a substantially center in the longitudinal (L) direction of the multilayer ceramic capacitor.

In view of maintaining the shape and performance of the multilayer ceramic capacitor 1, the inner layer 41a is preferably thinner than the outer layer 41b. Likewise, the inner layer 42a is preferably thinner than the outer layer 42b.

The inner layers 41a and 42a each preferably have a thickness of about 0.1 μm or more and about 20 μm or less, for example. The inner layers 41a and 42a preferably have the same thickness.

The outer layers 41b and 42b each preferably have a thickness of about 5 μm or more and about 20 μm or less, for example. The outer layers 41b and 42b preferably have the same or substantially the same thickness.

The side margins 41 and 42 each preferably have a thickness of 5 µm or more and 40 µm or less, and more preferably 5 µm or more and 20 µm or less, for example. The side margins 41 and 42 preferably have the same or substantially the same thickness.

The thickness of each ceramic layer of the side margin is an average value from measurements of the thickness of each ceramic layer of the side margin at multiple sites in the lamination (T) direction.

Specifically, the WT cross section is exposed at or substantially at a center in the longitudinal (L) direction of the multilayer ceramic capacitor, and is photographed using an optical microscope or an electronic microscope such that the ends of the first and second internal electrode layers in the width (W) direction and one of the side margins in the WT cross section appear in the same viewing field. The sites to be photographed are an upper portion, a central portion, and a lower portion (three in total) in the lamination (T) direction. In the upper portion, central portion, and lower portion, multiple segments which are parallel or substantially parallel to the width (W) direction are drawn from the ends of the first and second internal electrode layers in the width (W) direction to the lateral surface of the laminate, and the length of each segment is measured. An average value from measurements of the segment length is calculated for each of the upper portion, central portion and lower portion. These average values are further averaged, whereby the thickness of each ceramic layer is determined.

The composition of the ceramic defining each ceramic layer of the side margin 41 may be different from the composition of the ceramic defining the dielectric ceramic layers 20. In this case, the composition of the ceramic defining at least one of the inner layer 41a or the outer layer 41b may be different from the composition of the ceramic defining the dielectric ceramic layers 20.

Likewise, the composition of the ceramic defining each ceramic layer of the side margin 42 may be different from the composition of the ceramic defining the dielectric ceramic layers 20. In this case, the composition of the ceramic defining at least one of the inner layer 42a or the outer layer 42b may be different from the composition of the ceramic defining the dielectric ceramic layers 20.

When the side margin 41 includes two layers including the inner layer 41a and the outer layer 41b, the average particle size of the ceramic particles defining the inner layer 41a is preferably larger than the average particle size of the ceramic particles defining the outer layer 41b and the average particle size of the ceramic particles defining the dielectric ceramic layers 20. The average particle size of the ceramic particles defining the outer layer 41b may be equal or substantially equal to or different from the average particle size of the ceramic particles defining the dielectric ceramic layers 20.

Likewise, when the side margin 42 includes two layers including the inner layer 42a and the outer layer 42b, the average particle size of the ceramic particles defining the inner layer 42a is preferably larger than the average particle size of the ceramic particles defining the outer layer 42b and the average particle size of the ceramic particles defining the dielectric ceramic layers 20. The average particle size of the ceramic particles defining the outer layer 42b may be equal or substantially equal to or different from the average particle size of the ceramic particles defining the dielectric ceramic layers 20.

When the average particle size of the ceramic particles defining the inner layer is larger than the average particle size of the ceramic particles defining the outer layer and the average particle size of the ceramic particles defining the dielectric ceramic layer, the number of ceramic particles in contact with the outer layer and the dielectric ceramic layer decreases on both interfaces of the inner layer. In other words, on both interfaces of the inner layer, there are less grain boundaries of ceramic particles which tend to be sites of the onset of cracking and separation of the outer layer and the dielectric ceramic layer. Thus, the outer layer and the dielectric ceramic layer maintain a good joined state via the inner layer.

The average particle size of the ceramic particles defining each ceramic layer is an average value determined by photographing a WT cross section of the multilayer ceramic capacitor by a scanning electron microscope (SEM) at a specific magnification to obtain an image, measuring particle sizes of several ceramic particles of any size in the image, and averaging the measurements.

Specifically, the WT cross section is exposed at a substantially center of the multilayer ceramic capacitor in the longitudinal (L) direction, and three sites are photographed at a magnification of 10000 times in each of the dielectric ceramic layer, inner layer, and outer layer at or substantially at a center in the lamination (T) direction to obtain images. Then, 15 or more ceramic particles are selected from the images. The particle size of each ceramic particle selected is measured through image analysis, and the measurements are averaged to determine the average particle size.

Method of Producing Multilayer Ceramic Capacitor

A method of producing a multilayer ceramic capacitor according to the first preferred embodiment of the present invention preferably includes preparing a green chip having a laminated structure including multiple dielectric ceramic layers and multiple pairs of a first internal electrode layer and a second internal electrode layer in a raw state in which the first internal electrode layers and the second internal electrode layers are exposed to a first lateral surface and a second lateral surface that oppose each other in a width direction perpendicular or substantially perpendicular to a lamination direction, producing a raw laminate by forming a raw side margin on each of the first lateral surface and the second lateral surface of the green chip; and sintering the raw laminate. Producing the raw laminate includes forming a raw inner layer on each of the first lateral surface and the second lateral surface and forming a raw outer layer on the outermost side of each of the first lateral surface and the second lateral surface so as to form the raw side margins.

The following describes a non-limiting example embodiment of a method of producing the multilayer ceramic capacitor 1 shown in FIG. 1.

First, a ceramic green sheet that turns into the dielectric ceramic layers 20 is prepared. The ceramic green sheet includes ceramic raw materials that include the dielectric ceramic material, and components such as a binder and a solvent. The ceramic green sheet is preferably formed on a carrier film using a coater such as a die coater, a gravure coater, or a micro gravure coater, for example.

Figure 5A:
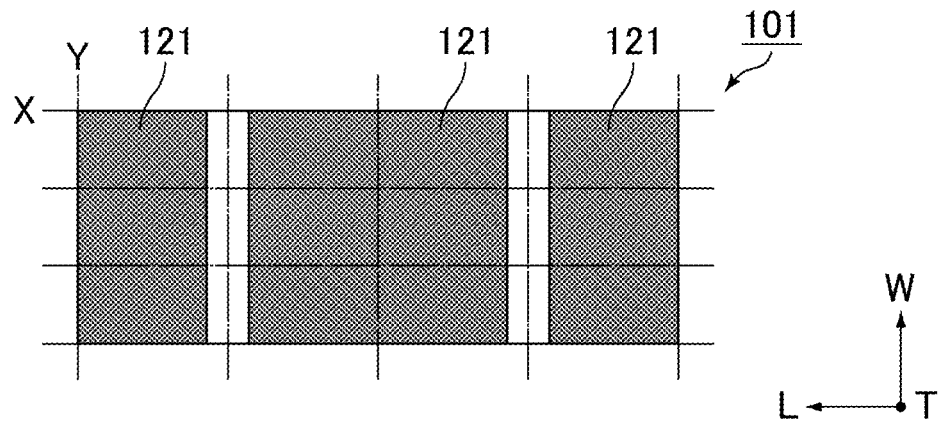
FIGS. 5A to 5C are plan views each schematically showing an example ceramic green sheet according to a preferred embodiment of the present invention.
Figure 5B:
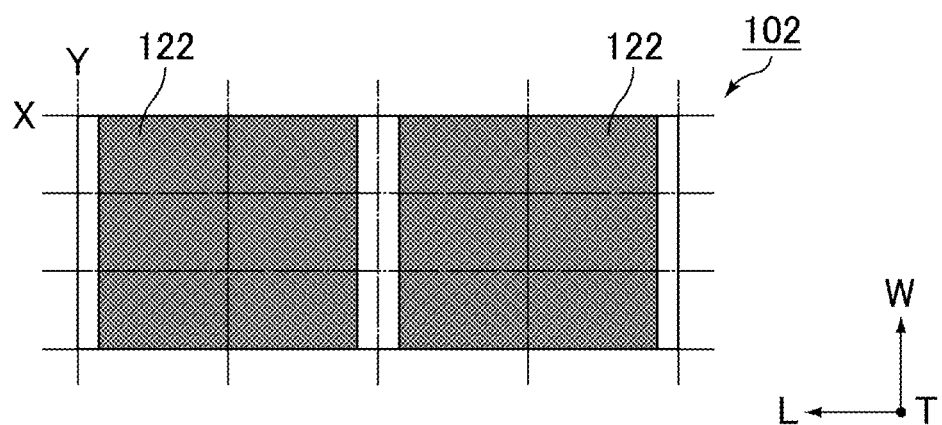
Figure 5C:
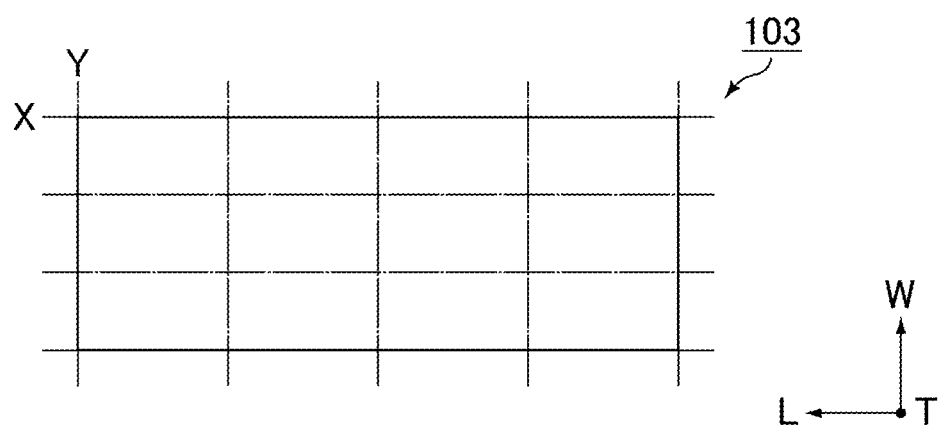

FIGS. 5A to 5C are plan views each schematically showing an example ceramic green sheet.

FIGS. 5A to 5C respectively show a first ceramic green sheet 101 that forms the central layer portion 30, a second ceramic green sheet 102 that forms the central layer portion 30, and a third ceramic green sheet 103 that forms the peripheral layer portion 31 or 32.

In FIGS. 5A to 5C, the first ceramic green sheet 101, the second ceramic green sheet 102, and the third ceramic green sheet 103 are not cut by each multilayer ceramic capacitor 1. FIG. 5A to FIG. 5C show cutting lines X and Y used in cutting the green sheets by each multilayer ceramic capacitor 1. The cutting lines X are parallel or substantially parallel to the longitudinal (L) direction, and the cutting lines Y are parallel or substantially parallel to the width (W) direction.

As shown in FIG. 5A, raw first internal electrode layers 121 corresponding to the first internal electrode layers 21 are formed in the first ceramic green sheet 101. As shown in FIG. 5B, raw second internal electrode layers 122 corresponding to the second internal electrode layers 22 are formed in the second ceramic green sheet 102. As shown in FIG. 5C, the raw internal electrode layers 121 or 122 are not formed in the third ceramic green sheet 103 corresponding to the peripheral layer portion 31 or 32.

The first internal electrode layers 121 and the second internal electrode layers 122 can be formed by using any conductive paste. A method such as screen printing or gravure printing can be used, for example, to form the first internal electrode layers 121 and the second internal electrode layers 122 with conductive paste.

The first internal electrode layers 121 and the second internal electrode layers 122 are each disposed over two regions adjacent to each other in the longitudinal (L) direction divided by the cutting lines Y, and extend in a band-shaped fashion in the width (W) direction. The first internal electrode layers 121 are shifted by one column relative to the second internal electrode layers 122 in the longitudinal (L) direction divided by the cutting lines Y. In other words, a cutting line Y passing through the center of each first internal electrode layer 121 passes through a region between the second internal electrode layers 122, and a cutting line Y passing through the center of the second internal electrode layer 122 passes through a region between the first internal electrode layers 121.

Subsequently, the first ceramic green sheets 101, the second ceramic green sheets 102, and the third ceramic green sheets 103 are laminated together to produce a mother block.

Figure 6:
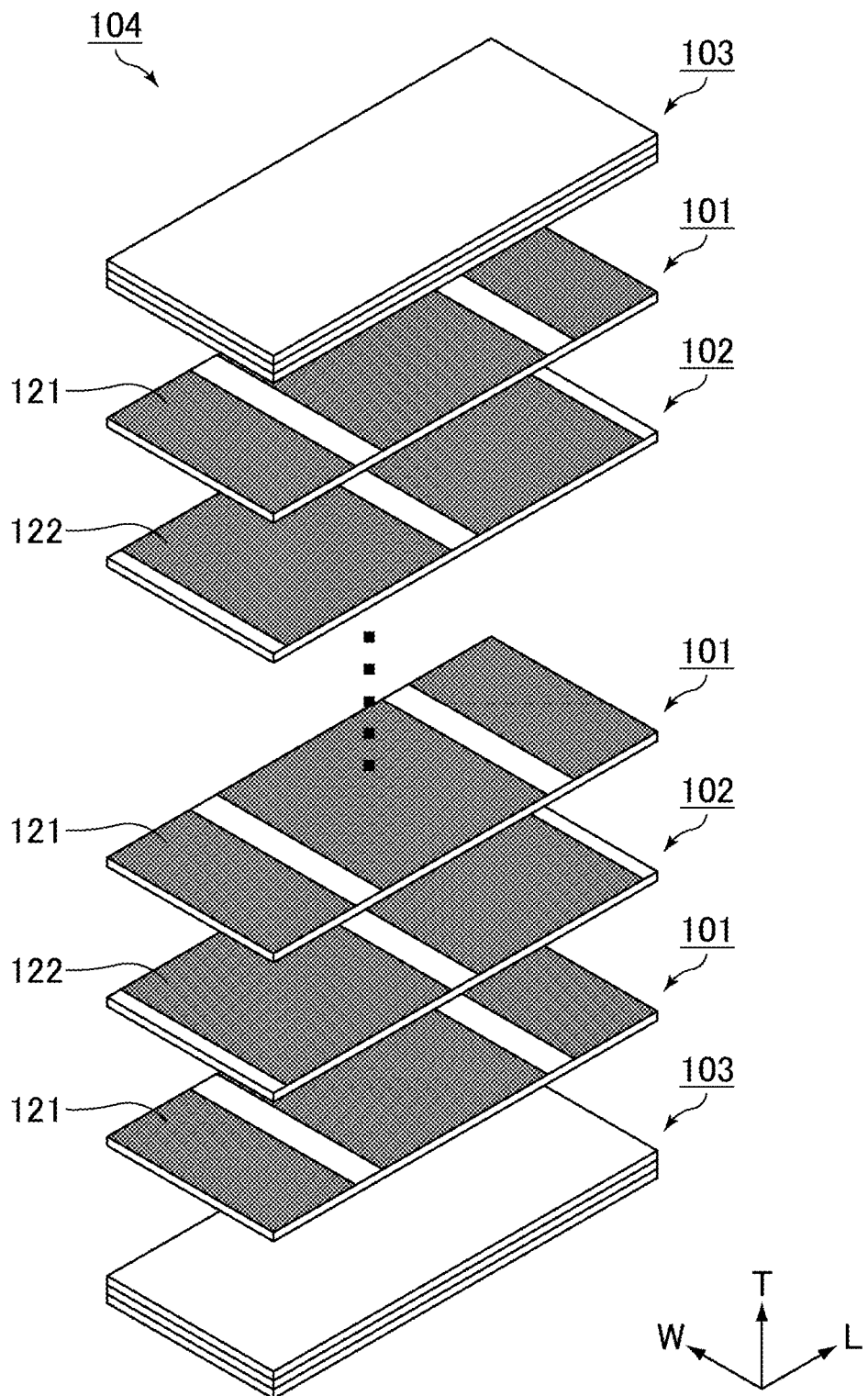
FIG. 6 is an exploded perspective view schematically showing an example of a mother block according to a preferred embodiment of the present invention.

FIG. 6 is an exploded perspective view schematically showing an example mother block.

For the sake of description, FIG. 6 shows an exploded view of the first ceramic green sheets 101, the second ceramic green sheets 102, and the third ceramic green sheets 103. In an actual mother block 104, the first ceramic green sheets 101, the second ceramic green sheets 102, and the third ceramic green sheets 103 are compressed and integrated together by isostatic pressing, for example.

In the mother block 104 shown in FIG. 6, the first ceramic green sheets 101 and the second ceramic green sheets 102 corresponding to the central layer portion 30 are alternately laminated in the lamination (T) direction. Further, the third ceramic green sheets 103 corresponding to the peripheral layer portions 31 and 32 are laminated on the top and bottom surfaces in the lamination (T) direction of the laminate of the first ceramic green sheets 101 and the second ceramic green sheets 102 which are alternately laminated. While FIG. 6 shows three third ceramic green sheets 103 laminated on each of the top and bottom surfaces, the number of the third ceramic green sheets 103 can be suitably varied.

The resulting mother block 104 is cut along the cutting lines X and Y (see FIGS. 5A to 5C), whereby multiple green chips are produced. A method such as dicing, force-cutting, or laser cutting, for example, is suitably used for the cutting.

Figure 7:
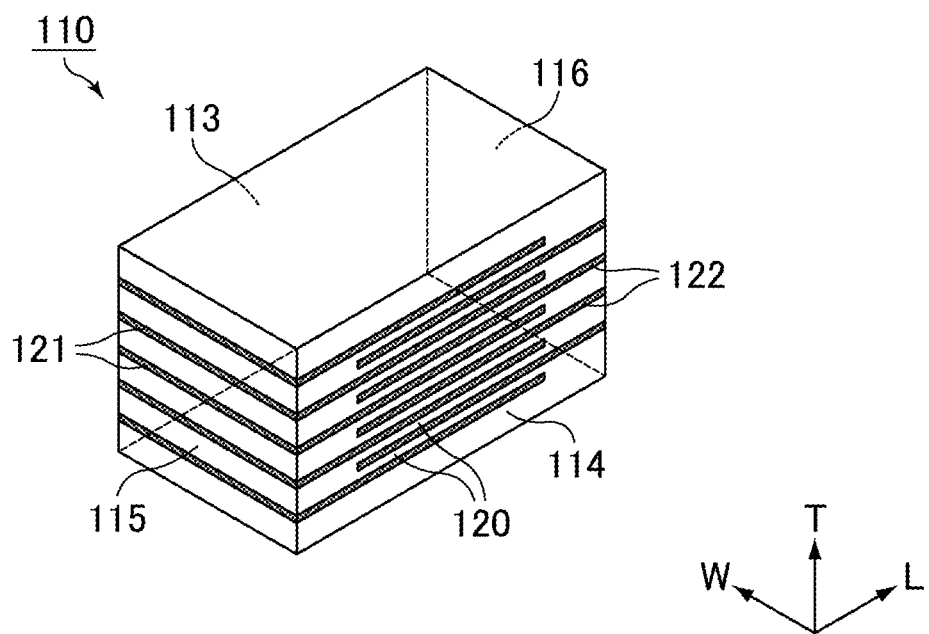
FIG. 7 is a perspective view schematically showing an example green chip according to a preferred embodiment of the present invention.

FIG. 7 is a perspective view schematically showing an example green chip.

A green chip 110 shown in FIG. 7 has a laminated structure including multiple dielectric ceramic layers 120 and multiple pairs of the first internal electrode layers 121 and the second internal electrode layers 122 in a raw state. A first lateral surface 113 and a second lateral surface 114 of the green chip 110 are surfaces that emerged from cutting along a cutting line X, and a first end surface 115 and a second end surface 116 are surfaces that emerged from cutting along a cutting line Y. The first internal electrode layers 121 and the second internal electrode layers 122 are exposed on the first lateral surface 113 and the second lateral surface 114. Only the first internal electrode layers 121 are exposed on the first end surface 115, and only the second internal electrode layers 122 are exposed on the second end surface 116.

Raw side margins are formed on the first lateral surface 113 and the second lateral surface 114 of the green chip 110, whereby a raw laminate is produced. The raw side margins are formed, for example, by bonding side margin ceramic green sheets to the first lateral surface and the second lateral surface of the green chip.

For example, when the side margin includes two layers including the inner layer and the outer layer, first, in order to produce an inner layer ceramic green sheet, ceramic slurry is produced which includes ceramic raw materials that include a dielectric ceramic material mainly including $BaTiO_3$ or the like and components such as a binder and a solvent. A sintering aid may be added to an inner layer ceramic slurry. The inner layer functions as an adhesive to the green chip 110.

Next, in order to produce an outer layer ceramic green sheet, ceramic slurry is produced which includes ceramic raw materials that include a dielectric ceramic material mainly including $BaTiO_3$ or the like and components such as a binder and a solvent. Here, components such as ZrO, $Al_2O_3$, AlN, SiN, and SiC, for example, are added to an outer layer ceramic slurry. A sintering aid is preferably added to the outer layer ceramic slurry.

Alternatively, in order to produce the outer layer ceramic green sheet, a ceramic slurry may be produced which includes ceramic raw materials that include an oxide ceramic material mainly including ZrO, $Al_2O_3$, AlN, SiN, SiC, or the like and components such as a binder and a solvent, for example. In this case, a sintering aid is preferably added to the outer layer ceramic slurry.

The outer layer ceramic slurry is applied to the surface of a resin film and dried, whereby an outer layer ceramic green sheet is formed. The inner layer ceramic slurry is applied to the surface of the outer layer ceramic green sheet on the resin film and dried, whereby an inner layer ceramic green sheet is formed. Thus, a side margin ceramic green sheet having a bilayer structure is obtained.

The side margin ceramic green sheet having a bilayer structure can also be obtained, for example, by forming the outer layer ceramic green sheet and the inner layer ceramic green sheet in advance and bonding them together. The structure of the side margin ceramic green sheet is not limited to the bilayer structure, and may be a three- or more layered structure.

Then, the side margin ceramic green sheet is separated from the resin film.

Subsequently, the inner layer ceramic green sheet of the side margin ceramic green sheet is placed to oppose the first lateral surface 113 of the green chip 110, and preferably press-punched, for example, whereby the raw side margin 41 is formed. Further, the inner layer ceramic green sheet of the side margin ceramic green sheet is placed to oppose the second lateral surface 114 of the green chip 110, and press-punched, whereby the raw side margin 42 is formed. Here, an organic solvent that serves as an adhesive is preferably applied to the lateral surface of the green chip in advance.

The green chip 110 on which the raw side margins 41 and are formed is degreased under predetermined conditions, for example, in a nitrogen atmosphere, and then sintered at a predetermined temperature, for example, in a mixture atmosphere of nitrogen, hydrogen, and steam. Thus, the sintered laminate 10 (see FIG. 2) is obtained.

External electrode paste mainly including Cu is applied to and baked on each of the first end surface 15 and the second end surface 16 of the laminate 10, whereby a base electrode layer connected to the first internal electrode layers 21 and a base electrode layer connected to the second internal electrode layers 22 are formed. Further, a first plated layer is preferably formed by Ni plating on the surface of each base electrode layer, and a second plated layer is preferably formed by Sn plating on the surface of each first plated layer, for example. Thus, the first external electrode 51 and the second external electrode 52 are formed.

The multilayer ceramic capacitor 1 shown in FIG. 1 is produced as described above.

The raw side margin may be formed by bonding the side margin ceramic green sheet or applying the side margin ceramic slurry to each lateral surface of the green chip.

When the raw side margin is formed by applying the side margin ceramic slurry, the inner layer ceramic slurry is applied to each lateral surface of the green chip, and dried. Further, the outer layer ceramic slurry is applied to the surface of the resulting inner layer.

Alternatively, the side margin may be formed by masking both end surfaces of the green chip with resin or the like, dipping the green chip entirely into the inner layer ceramic slurry, drying the green chip, and further dipping the green ship into the outer layer ceramic slurry. In this case, the inner layer and the outer layer are also formed on the peripheral layer portion, resulting in a three-layered structure.

Second Preferred Embodiment

Multilayer Ceramic Capacitor

A multilayer ceramic capacitor according to a second preferred embodiment of the present invention is different from the multilayer ceramic capacitor according to the first preferred embodiment of the present invention in that a stepped portion including two or more steps is provided at an edge between the main surface and the lateral surface of the laminate.

Figure 8:
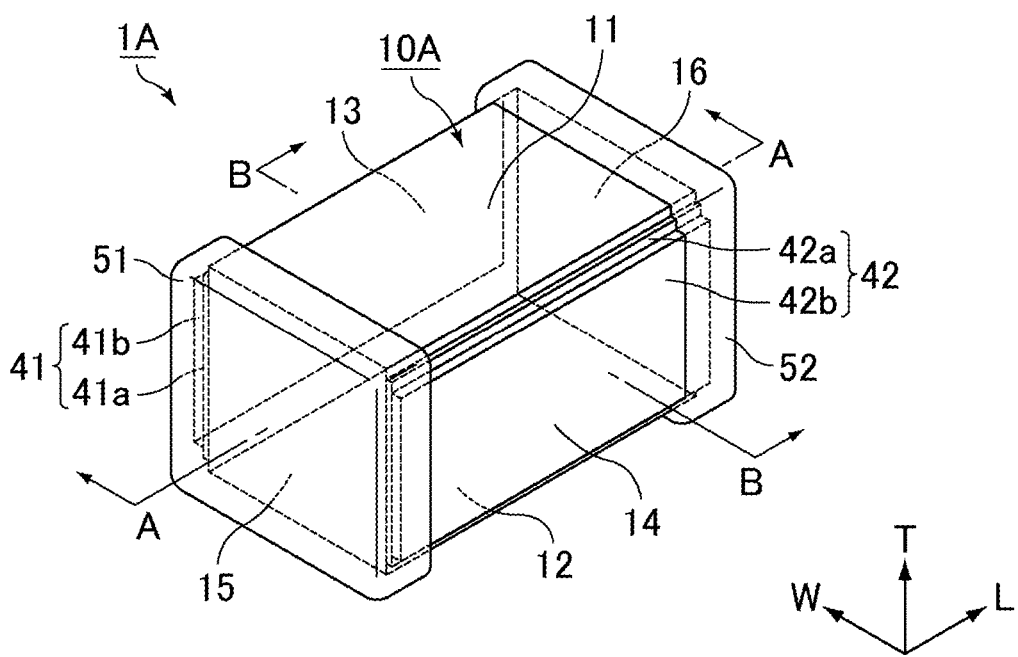
FIG. 8 is a perspective view schematically showing an example multilayer ceramic capacitor according to a second preferred embodiment of the present invention.
Figure 9:
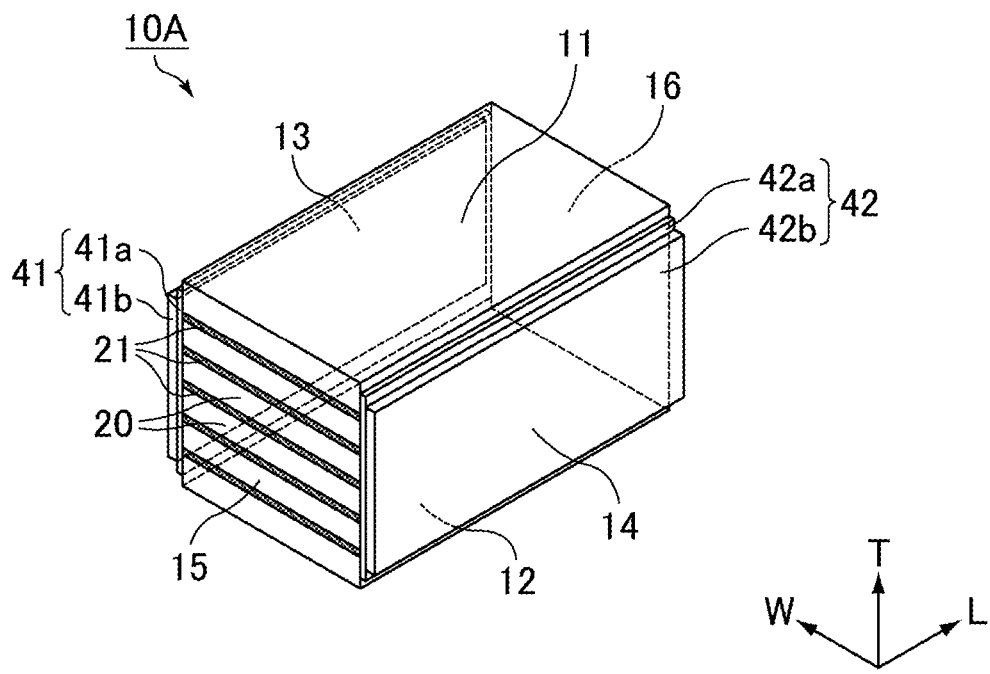
FIG. 9 is a perspective view schematically showing an example laminate defining the multilayer ceramic capacitor shown in FIG. 8.
Figure 11:
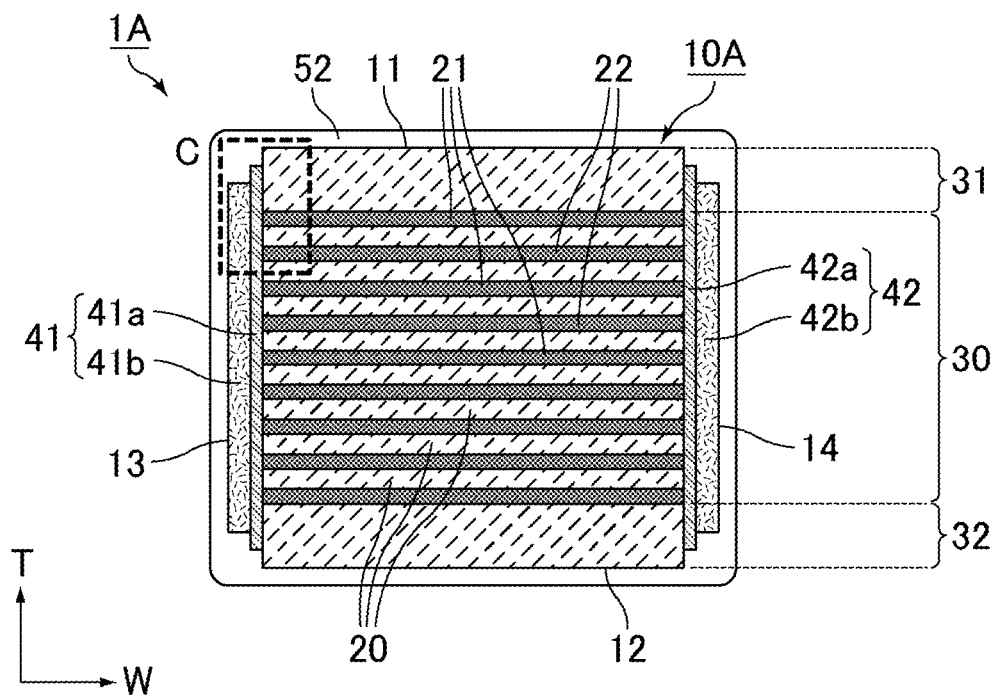
FIG. 11 is a cross-sectional view taken along the B-B line of the multilayer ceramic capacitor shown in FIG. 8.
Figure 12:
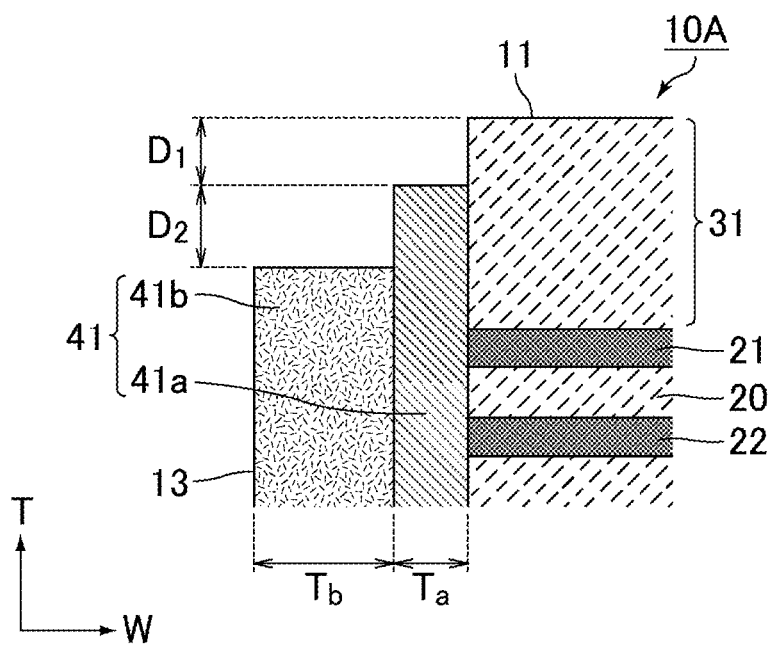
FIG. 12 is an enlarged view of a portion C of the multilayer ceramic capacitor shown in FIG. 11.

FIG. 8 is a perspective view schematically showing an example multilayer ceramic capacitor according to the second preferred embodiment of the present invention. FIG. 9 is a perspective view schematically showing an example laminate defining the multilayer ceramic capacitor shown in FIG. 8. FIG. is a cross-sectional view taken along the A-A line of the multilayer ceramic capacitor shown in FIG. 8. FIG. 11 is a cross-sectional view taken along the B-B line of the multilayer ceramic capacitor shown in FIG. 8. FIG. 12 is an enlarged view of the portion C of the multilayer ceramic capacitor shown in FIG. 11.

A multilayer ceramic capacitor 1A shown in FIG. 8 includes the laminate 10A, the first external electrode 51 on one end surface of the laminate 10A, and the second external electrode 52 on the other end surface of the laminate 10A.

The multilayer ceramic capacitor 1A shown in FIG. 8 preferably includes the same or substantially the same features as those of the multilayer ceramic capacitor 1 shown in FIG. 1, except for the following points. Likewise, the laminate 10A defining the multilayer ceramic capacitor 1A preferably has the same or substantially the same features as those of the laminate 10 defining the multilayer ceramic capacitor 1.

As shown in FIG. 9, the laminate 10A is preferably a rectangular or substantially rectangular cuboid. In the laminate 10A, corners and edges are preferably rounded.

Figure 10:
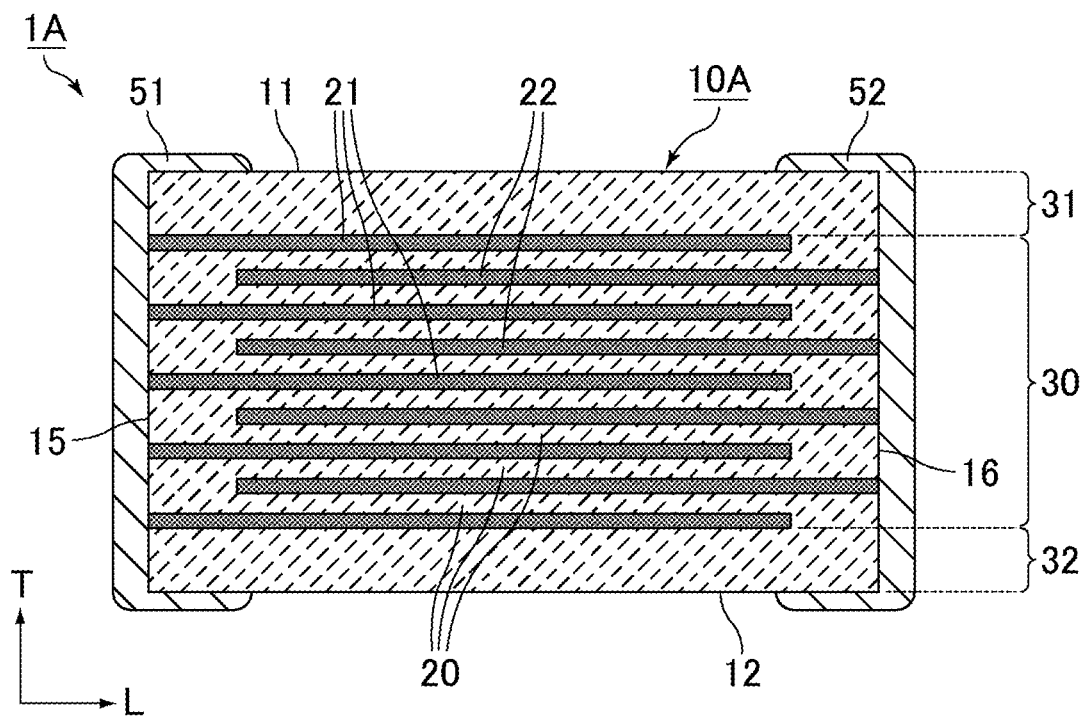
FIG. 10 is a cross-sectional view taken along the A-A line of the multilayer ceramic capacitor shown in FIG. 8.

As shown in FIG. 9, FIG. 10, and FIG. 11, the laminate 10A has a laminated structure including the multiple dielectric ceramic layers 20 stacked in the lamination (T) direction and the first internal electrode layer 21 and the second internal electrode layer 22 alternately formed along the interface between each dielectric ceramic layers 20.

As shown in FIG. 10 and FIG. 11, the laminate 10A includes the central layer portion 30 in which each first internal electrode layer 21 and each second internal electrode layer 22 oppose each other with the dielectric ceramic layer 20 therebetween, the peripheral layer portions 31 and 32 sandwiching the central layer portion 30 in the lamination (T) direction, and the side margins 41 and 42 sandwiching the central layer portion 30, the peripheral layer portion 31, and the peripheral layer portion 32 in the width (W) direction. In FIG. 10 and FIG. 11, the central layer portion 30 is a region that is sandwiched by the first internal electrode layer 21 closest to the first main surface 11 and the first internal electrode layer 21 closest to the second main surface 12 in the lamination (T) direction. Although not shown, each of the peripheral layer portion 31 and the peripheral layer portion 32 is preferably made of the multiple dielectric ceramic layers 20 laminated in the lamination (T) direction.

Preferably, each of the side margin 41 and the side margin 42 includes multiple ceramic layers laminated in the width (W) direction. In FIG. 11, the side margin 41 has a bilayer structure of the ceramic layers including the inner layer 41a disposed closest to the laminate 10A and the outer layer 41b disposed farthest from the laminate 10A. Likewise, the side margin 42 preferably includes a bilayer structure of the ceramic layers including the inner layer 42a disposed closest to the laminate 10A and the outer layer 42b disposed farthest from the laminate 10A. The structure of the side margin is not limited to the bilayer structure of the ceramic layers including the inner layer and the outer layer. The side margin may have a structure of a three- or more layered structure including another ceramic layer between the inner layer and the outer layer. The number of ceramic layers may be different between the side margin on the first lateral surface side of the laminate and the side margin on the second lateral surface side of the laminate.

As shown in FIG. 9, FIG. 11, and FIG. 12, a stepped portion including two steps is provided at an edge between the first main surface 11 and the first lateral surface 13 of the laminate 10A. Likewise, as shown in FIG. 9 and FIG. 11, a stepped portion including two steps is provided at an edge between the second main surface 12 and the first lateral surface 13 of the laminate 10A, at an edge between the first main surface 11 and the second lateral surface 14 of the laminate 10A, and at an edge between the second main surface 12 and the second lateral surface 14 of the laminate 10A.

Specifically, as shown in FIG. 9 and FIG. 11, on the first lateral surface 13 side of the laminate 10A, in the lamination (T) direction, the inner layer 41a is shorter than the total length of the central layer portion 30, the peripheral layer portion 31, and the peripheral layer portion 32, and the outer layer 41b is shorter than the inner layer 41a. Thus, a stepped portion including two steps is provided at an edge between the first main surface 11 and the first lateral surface 13 of the laminate 10A, and at an edge between the second main surface 12 and the first lateral surface 13 of the laminate 10A.

Likewise, on the second lateral surface 14 side of the laminate 10A, in the lamination (T) direction, the inner layer 42a is shorter than the total length of the central layer portion 30, the peripheral layer portion 31, and the peripheral layer portion 32, and the outer layer 42b is shorter than the inner layer 42a. Thus, a stepped portion including two steps is provided at an edge between the first main surface 11 and the second lateral surface 14 of the laminate 10A, and at an edge between the second main surface 12 and the second lateral surface 14 of the laminate 10A.

When the side margin includes a three- or more layered structure including the inner layer, the outer layer, and another ceramic layer between the inner layer and the outer layer, preferably, in the lamination direction, the inner layer is shorter than the total length of the central layer portion and the peripheral layer portion, and the length of the ceramic layer in each side margin decreases from the inner layer toward the outer layer, thus forming a stepped portion having three- or more steps.

The side margin may include a structure including only one ceramic layer. In this case, a stepped portion including two or more steps is provided on the ceramic layer defining the side margin.

As described above, when a stepped portion including two or more steps is provided at the edge between the main surface and the lateral surface of the laminate, the laminate is supported by more steps of the stepped portions. Thus, the laminate is less prone to cracking and chipping at the edge. Further, when providing an external electrode on the end surface of the laminate, the external electrode has better wettability to the laminate when the stepped portion has more steps. Thus, the external electrode can be easily provided at the edge of the laminate.

In the multilayer ceramic capacitor 1A shown in FIG. 8, while a stepped portion is not provided at the edge between the end surface and the lateral surface of the laminate 10A, a stepped portion including two or more steps may be provided.

Yet, it is preferred that a stepped portion is not provided at the edge between the end surface and the lateral surface of the laminate, in view of preventing exposure of the first internal electrode layers and the second internal electrode layers to the lateral surface of the laminate.

Hereinafter, a case is described where a stepped portion including two or more steps is provided at all of the edges between the main surfaces and the lateral surfaces of the laminate.

Yet, as long as a stepped portion including two or more steps is provided at at least one edge among four edges between the main surfaces and the lateral surfaces of the laminate, there may be an edge at which a stepped portion including two or more steps is not provided. For example, there may be an edge at which a stepped portion is not provided, or there may be an edge at which a stepped portion including only a single step is provided.

When the side margin 41 includes two layers including the inner layer 41a and the outer layer 41b, the distance (the length indicated by $D_1$ in FIG. 12) in the lamination (T) direction from the main surface of the peripheral layer portion 31 or 32 to the end surface of the inner layer 41a is preferably shorter than the distance (the length indicated by $D_2$ in FIG. 12) from the end surface of the inner layer 41a to the end surface of the outer layer 41b.

Likewise, when the side margin 42 includes two layers including the inner layer 42a and the outer layer 42b, the distance in the lamination (T) direction from the main surface of the peripheral layer portion 31 or 32 to the end surface of the inner layer 42a is preferably shorter than the distance from the end surface of the inner layer 42a to the end surface of the outer layer 42b.

When the distance from the main surface of the peripheral layer portion to the end surface of the inner layer is shorter than the distance from the end surface of the inner layer to the end surface of the outer layer, the laminate is less exposed, so that the laminate can be reliably protected by the inner layer.

The distance from the main surface of the peripheral layer portion 31 to the end surface of the inner layer 41a, the distance from the main surface of the peripheral layer portion 32 to the end surface of the inner layer 41a, the distance from the main surface of the peripheral layer portion 31 to the end surface of the inner layer 42a, and the distance from the main surface of the peripheral layer portion 32 to the end surface of the inner layer 42a may be equal to or different from each other. The distance from the end surface of the inner layer 41a to the end surface of the outer layer 41b and the distance from the end surface of the inner layer 42a to the end surface of the outer layer 42b may be the same or different between the first main surface 11 and the second main surface 12.

When the side margin 41 includes two layers including the inner layer 41a and the outer layer 41b, the distance (the total of the length indicated by $D_1$ and the length indicated by $D_2$ in FIG. 12) in the lamination (T) direction from the main surface of the peripheral layer portion 31 or 32 to the end surface of the outer layer 41b is preferably shorter than the thickness of the peripheral layer portion 31 or 32.

Likewise, when the side margin 42 includes two layers including the inner layer 42a and the outer layer 42b, the distance in the lamination (T) direction from the main surface of the peripheral layer portion 31 or 32 to the end surface of the outer layer 42b is preferably shorter than the thickness of the peripheral layer portion 31 or 32.

In view of maintaining the shape and performance of the multilayer ceramic capacitor 1A, the inner layer 41a is preferably thinner than the outer layer 41b. Likewise, the inner layer 42a is preferably thinner than the outer layer 42b.

The inner layers 41a and 42a each preferably have a thickness (the length indicated by $T_a$ in FIG. 12) of about 0.1 μm or more and about 20 μm or less, for example. The inner layers 41a and 42a preferably have the same or substantially the same thickness.

The outer layers 41b and 42b each preferably have a thickness (the length indicated by $T_b$ in FIG. 12) of about 5 μm or more and about 20 μm or less, for example. The outer layers 41b and 42b preferably have the same or substantially the same thickness.

The side margins 41 and 42 each preferably have a thickness of about 5 μm or more and about 40 μm or less, and more preferably about 5 μm or more and about 20 μm or less, for example. The side margins 41 and 42 preferably have the same or substantially the same thickness.

The inner layer 41a and the inner layer 42a are preferably made of, for example, a dielectric ceramic material mainly including $BaTiO_3$, $CaTiO_3$, $SrTiO_3$, $CaZrO_3$, or the like. The inner layer 41a and the inner layer 42a may further include a sintering aid element described later.

The inner layer 41a and the inner layer 42a are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

The outer layer 41b and the outer layer 42b are preferably made of, for example, a dielectric ceramic material mainly including $BaTiO_3$, $CaTiO_3$, $SrTiO_3$, $CaZrO_3$, or the like. Preferably, the outer layer 41b and the outer layer 42b each further include a sintering aid element described later.

The outer layer 41b and the outer layer 42b are preferably made of the same dielectric ceramic material as that of the inner layer 41a and the inner layer 42a, but may be made of a dielectric ceramic material different from that of the inner layer 41a and the inner layer 42a. The outer layer 41b and the outer layer 42b are preferably made of the same dielectric ceramic material as that of the dielectric ceramic layers 20 defining the central layer portion 30, the peripheral layer portion 31, and the peripheral layer portion 32, but may be made of a dielectric ceramic material different from that of the dielectric ceramic layers 20 defining the central layer portion 30, the peripheral layer portion 31, and the peripheral layer portion 32.

In the multilayer ceramic capacitor 1A, the outer layer 41b preferably includes a larger amount of a sintering aid element than the inner layer 41a. The outer layer 42b preferably includes a larger amount of the sintering aid element than the inner layer 42a.

In this case, the outer layer can have a higher sinterability than the inner layer. In addition, the outer layer can have a higher hardness than the inner layer. As a result, the outer layer can be made dense.

Examples of the sintering aid element include Si, B, Li, K, Na, Mn, Mg, Ho, Ca, and V. Only one of these sintering aid elements may be used, or two or more of them may be used. When two or more sintering aid elements are used, preferably, the outer layer includes at least one of these elements in an amount larger than that in the inner layer.

When the amount of the sintering aid element in the outer layer is larger than the amount of the sintering aid element in the inner layer on one lateral surface side, the amount of the sintering aid element in the outer layer may be equal to or smaller than the amount of the sintering aid element in the inner layer on the other lateral surface side.

The composition of the ceramic defining each ceramic layer of the side margin 41 may be different from the composition of the ceramic defining the dielectric ceramic layers 20. In this case, the composition of the ceramic defining at least one of the inner layer 41a or the outer layer 41b may be different from the composition of the ceramic defining the dielectric ceramic layers 20.

Likewise, the composition of the ceramic defining each ceramic layer of the side margin 42 may be different from the composition of the ceramic defining the dielectric ceramic layers 20. In this case, the composition of the ceramic defining at least one of the inner layer 42a or the outer layer 42b may be different from the composition of the ceramic defining the dielectric ceramic layers 20.

When the side margin 41 includes two layers including the inner layer 41a and the outer layer 41b, the average particle size of the ceramic particles defining the inner layer 41a is preferably larger than the average particle size of the ceramic particles defining the outer layer 41b and the average particle size of the ceramic particles defining the dielectric ceramic layers 20. The average particle size of the ceramic particles defining the outer layer 41b may be substantially equal to or different from the average particle size of the ceramic particles defining the dielectric ceramic layers 20.

Likewise, when the side margin 42 includes two layers including the inner layer 42a and the outer layer 42b, the average particle size of the ceramic particles defining the inner layer 42a is preferably larger than the average particle size of the ceramic particles defining the outer layer 42b and the average particle size of the ceramic particles defining the dielectric ceramic layers 20. The average particle size of the ceramic particles defining the outer layer 42b may be substantially equal to or different from the average particle size of the ceramic particles defining the dielectric ceramic layers 20.

Method of Producing Multilayer Ceramic Capacitor

A preferred embodiment of a method of producing the multilayer ceramic capacitor according to the second preferred embodiment of the present invention preferably includes preparing a green chip including a laminated structure including multiple dielectric ceramic layers and multiple pairs of a first internal electrode layer and a second internal electrode layer in a raw state in which the first internal electrode layers and the second internal electrode layers are exposed to a first lateral surface and a second lateral surface that oppose each other in a width direction perpendicular or substantially perpendicular to a lamination direction, producing a raw laminate by forming a raw side margin on each of the first lateral surface and the second lateral surface of the green chip, and sintering the raw laminate.

The step of producing the raw laminate includes forming a raw inner layer on each of the first lateral surface and the second lateral surface and forming a raw outer layer on the outermost side of each of the first lateral surface and the second lateral surface so as to form the raw side margins.

The following describes a non-limiting example method of producing the multilayer ceramic capacitor 1A shown in FIG. 8. The multilayer ceramic capacitor 1A can be produced as in the multilayer ceramic capacitor 1 shown in FIG. 1, except for the following points.

First, a ceramic green sheet that turns into the dielectric ceramic layers 20 is prepared. Subsequently, the first ceramic green sheets 101 shown in FIG. 5A, the second ceramic green sheets 102 shown in FIG. 5B, and the third ceramic green sheets 103 shown in FIG. 5C are laminated together to produce the mother block 104 (see FIG. 6). The resulting mother block 104 is cut along the cutting lines X and Y (see FIGS. 5A to 5C), whereby multiple green chips 110 (see FIG. 7) are produced.

Raw side margins are formed on each of the first lateral surface 113 and the second lateral surface 114 of the green chip 110, whereby a raw laminate is produced. The raw side margins are preferably formed, for example, by bonding side margin ceramic green sheets to the first lateral surface and the second lateral surface of the green chip. For example, when the side margin includes two layers including the inner layer and the outer layer, the outer layer ceramic slurry is applied to the surface of a resin film and dried, whereby an outer layer ceramic green sheet is formed. The inner layer ceramic slurry is applied to the surface of the outer layer ceramic green sheet on the resin film and dried, whereby an inner layer ceramic green sheet is formed. Thus, a side margin ceramic green sheet having a bilayer structure is obtained.

The side margin ceramic green sheet having a bilayer structure can also be obtained, for example, by forming the outer layer ceramic green sheet and the inner layer ceramic green sheet in advance and bonding them together. The structure of the side margin ceramic green sheet is not limited to the bilayer structure, and may be a three- or more layered structure. Then, the side margin ceramic green sheet is separated from the resin film.

Subsequently, the inner layer ceramic green sheet of the side margin ceramic green sheet is placed to oppose the first lateral surface 113 of the green chip 110, and preferably press-punched, for example, whereby the raw side margin 41 is formed. Further, the inner layer ceramic green sheet of the side margin ceramic green sheet is placed to oppose the second lateral surface 114 of the green chip 110, and preferably press-punched, for example, whereby the raw side margin 42 is formed. Here, an organic solvent that serves as an adhesive is preferably applied to the lateral surface of the green chip in advance.

Here, the composition of each ceramic green sheet is adjusted in order to make the outer layer ceramic green sheet more breakable than the inner layer ceramic green sheet. For example, the composition is adjusted by decreasing the amount of the resin, decreasing the amount or ratio of the plasticizer, or increasing the ratio of the resin having a lower degree of polymerization or a smaller molecular weight. This results in a difference in length between the inner layer and the outer layer after punching. As a result, a stepped portion is formed at the edge between the main surface and the lateral surface of the green chip on which the raw side margin is formed.

Alternatively, the inner layer ceramic green sheet and the outer layer ceramic green sheet that have been made to have different lengths from each other may be bonded to the lateral surfaces of the green chip.

The green chip 110 on which the raw side margins 41 and 42 are formed is, degreased under predetermined conditions, for example, in a nitrogen atmosphere, and then sintered at a predetermined temperature, for example, in a mixture atmosphere of nitrogen, hydrogen, and steam. Thus, the sintered laminate 10A (see FIG. 9) is obtained.

External electrode paste mainly including Cu is preferably applied to and baked on each of the first end surface 15 and the second end surface 16 of the laminate 10A, whereby a base electrode layer connected to the first internal electrode layers 21 and a base electrode layer connected to the second internal electrode layers 22 are formed. Further, a first plated layer is preferably formed by Ni plating on the surface of each base electrode layer, and a second plated layer is preferably formed by Sn plating on the surface of each first plated layer. Thus, the first external electrode 51 and the second external electrode 52 are formed.

The multilayer ceramic capacitor 1A shown in FIG. 8 is produced as described above.

The raw side margin may be formed by bonding the side margin ceramic green sheet or applying the side margin ceramic slurry to each lateral surface of the green chip. When the raw side margin is formed by applying the side margin ceramic slurry, the inner layer ceramic slurry is applied to each lateral surface of the green chip, and dried. Further, the outer layer ceramic slurry is applied to the surface of the resulting inner layer. At the time of application, each ceramic slurry is applied such that the inner layer and the outer layer have different lengths.

Alternatively, the side margin may be formed by masking both end surfaces of the green chip with resin or the like, dipping the green chip entirely into the inner layer ceramic slurry, drying the green chip, and further dipping the green ship into the outer layer ceramic slurry. At the time of dipping, the lateral surface of the green chip is partially masked with resin or the like before and after formation of the inner layer such that the inner layer and the outer layer have different lengths, and the green chip is dipped into each ceramic slurry. In this case, the inner layer and the outer layer are formed also on the peripheral layer portion, resulting in a three-layered structure.

The present invention is not limited to the above-described preferred embodiments. Various modifications and changes can be made to the structures, production conditions, and the like of the multilayer ceramic capacitor and the multilayer ceramic electronic component without departing from the gist of the present invention.

In the above preferred embodiment, the mother block 104 is preferably cut along the cutting lines X and Y to produce multiple green chips, and the raw side margin is formed on each lateral surface of the green chip. Yet, the preferred embodiment may be modified.

Specifically, the mother block may be cut only along the cutting lines X to produce multiple rod-shaped green blocks in which the first internal electrode layers and the second internal electrode layers are exposed to lateral surfaces that emerged from the cutting along the cutting lines X. Then, the raw side margins are formed on the lateral surfaces of each green block, and the green blocks are cut along the cutting lines Y to produce multiple raw laminates, followed by sintering of the raw laminates. After sintering, the same steps as in the preferred embodiment described above are performed, whereby multilayer ceramic electronic components such as multilayer ceramic capacitors can be produced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a laminate including multiple dielectric ceramic layers and multiple pairs of a first internal electrode layer and a second internal electrode layer laminated in a lamination direction, and including:
        a first main surface and a second main surface that oppose each other in the lamination direction;
        a first lateral surface and a second lateral surface that oppose each other in a width direction perpendicular or substantially perpendicular to the lamination direction; and
        a first end surface and a second end surface that oppose each other in a longitudinal direction perpendicular or substantially perpendicular to the lamination direction and the width direction;
    a first external electrode on the first end surface of the laminate and connected to the first internal electrode layer on the first end surface; and
    a second external electrode on the second end surface of the laminate and connected to the second internal electrode layer on the second end surface; wherein
    the laminate further includes:
        a central layer portion in which each first internal electrode layer and each second internal electrode layer oppose each other with the dielectric ceramic layer therebetween;
        peripheral layer portions sandwiching the central layer portion in the lamination direction; and side margins sandwiching the central layer portion and the peripheral layer portions in the width direction;

the side margins each include multiple ceramic layers laminated in the width direction, and the ceramic layers include an inner layer disposed closest to the laminate and an outer layer disposed farthest from the laminate; and a total amount of at least one element selected from a group consisting of Zr and Al included in the outer layer is larger than a total amount of at least one element selected from the group consisting of Zr and Al included in the inner layer.

2. The multilayer ceramic electronic component according to claim 1, wherein the outer layer includes a larger amount of a sintering aid element than the inner layer.

3. The multilayer ceramic electronic component according to claim 2, wherein the sintering aid element is one or more of Si, B, Li, K, Na, Mn, Mg, Ho, Ca, and V.

4. The multilayer ceramic electronic component according to claim 1, wherein the inner layer is thinner than the outer layer.

5. The multilayer ceramic electronic component according to claim 1, wherein ceramic defining each ceramic layer of the side margin has a composition different from a composition of a ceramic defining the dielectric ceramic layer.

6. The multilayer ceramic electronic component according to claim 1, wherein the side margin includes two layers including the inner layer and the outer layer; and ceramic particles defining the inner layer have an average particle size larger than an average particle size of ceramic particles defining the outer layer and an average particle size of ceramic particles defining the dielectric ceramic layer.

7. The multilayer ceramic electronic component according to claim 1, wherein the first internal electrode layers and the second internal electrode layers each include a metal and a same dielectric ceramic material as is included in the dielectric ceramic layers.

8. The multilayer ceramic electronic component according to claim 1, wherein the first internal electrode layers and the second internal electrode layers each have a thickness of about 0.3 μm or more and about 2.0 μm or less.

9. The multilayer ceramic electronic component according to claim 1, wherein the first external electrode and the second external electrode both have a multi-layer structure including a base electrode layer and at least one plated layer.

10. The multilayer ceramic electronic component according to claim 1, wherein the central layer portion has a thickness of about 0.2 μm or more and about 10 μm or less; and the peripheral layer portions each have a thickness of about 15 μm or more and about 40 μm or less.

11. The multilayer ceramic electronic component according to claim 1, wherein the inner layer has a thickness of about 0.1 μm or more and about 20 μm or less; and the outer layer has a thickness of about 5 μm or more and about 20 μm or less.

12. A multilayer ceramic electronic component comprising:

a laminate including multiple dielectric ceramic layers and multiple pairs of a first internal electrode layer and a second internal electrode layer laminated in a lamination direction, and including:

a first main surface and a second main surface that oppose each other in the lamination direction;

a first lateral surface and a second lateral surface that oppose each other in a width direction perpendicular or substantially perpendicular to the lamination direction; and a first end surface and a second end surface that oppose each other in a longitudinal direction perpendicular or substantially perpendicular to the lamination direction and the width direction;

a first external electrode on the first end surface of the laminate and connected to the first internal electrode layer on the first end surface; and a second external electrode on the second end surface of the laminate and connected to the second internal electrode layer on the second end surface; wherein the laminate further includes:

a central layer portion in which each first internal electrode layer and each second internal electrode layer oppose each other with the dielectric ceramic layer therebetween;

peripheral layer portions sandwiching the central layer portion in the lamination direction; and side margins sandwiching the central layer portion and the peripheral layer portions in the width direction; and a stepped portion including two or more steps is provided at an edge between the main surface and the lateral surface of the laminate.

13. The multilayer ceramic electronic component according to claim 12, wherein the side margins each include multiple ceramic layers laminated in the width direction, and the ceramic layers include an inner layer closest to the laminate and an outer layer farthest from the laminate; and in the lamination direction, the inner layer is shorter than the total length of the central layer portion and the peripheral layer portions and the length of the ceramic layer in each side margin decreases from the inner layer toward the outer layer to define the stepped portion.

14. The multilayer ceramic electronic component according to claim 13, wherein each side margin includes two layers including the inner layer and the outer layer; and in the lamination direction, a total distance from the main surface of the peripheral layer portion to an end surface of the inner layer is shorter than a total distance from the end surface of the inner layer to an end surface of the outer layer.

15. The multilayer ceramic electronic component according to claim 12, wherein the first internal electrode layers and the second internal electrode layers each include a metal and a same dielectric ceramic material as is included in the dielectric ceramic layers.

16. The multilayer ceramic electronic component according to claim 12, wherein the first external electrode and the second external electrode both have a multi-layer structure including a base electrode layer and at least one plated layer.

* * * * *